(12) United States Patent
Moritomo

(10) Patent No.: US 11,290,434 B2
(45) Date of Patent: Mar. 29, 2022

(54) COMMUNICATION DEVICE, METHOD OF CONTROLLING COMMUNICATION DEVICE, AND NON-TRANSITORY COMPUTER-READABLE STORAGE MEDIUM

(71) Applicant: CANON KABUSHIKI KAISHA, Tokyo (JP)

(72) Inventor: Kazuo Moritomo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 238 days.

(21) Appl. No.: 16/529,917

(22) Filed: Aug. 2, 2019

(65) Prior Publication Data
US 2020/0053060 A1    Feb. 13, 2020

(30) Foreign Application Priority Data

Aug. 10, 2018 (JP) .............................. JP2018-151965

(51) Int. Cl.
*H04L 29/06* (2006.01)
*H04L 9/32* (2006.01)
*H04L 9/08* (2006.01)

(52) U.S. Cl.
CPC ........ *H04L 63/0442* (2013.01); *H04L 9/0825* (2013.01); *H04L 9/3268* (2013.01); *H04L 63/0823* (2013.01)

(58) Field of Classification Search
None
See application file for complete search history.

(56) References Cited

U.S. PATENT DOCUMENTS

| 9,544,299 | B2 | 1/2017 | Takeda |
| 10,149,159 | B1* | 12/2018 | Perfitt ................ H04W 12/069 |
| 10,193,698 | B1* | 1/2019 | Das ...................... H04L 9/3268 |
| 2004/0015689 | A1* | 1/2004 | Billhartz .............. H04L 63/061 |
| | | | 713/156 |
| 2006/0204003 | A1* | 9/2006 | Takata ................. H04L 9/0891 |
| | | | 380/30 |
| 2012/0324218 | A1* | 12/2012 | Duren ................... H04L 9/0825 |
| | | | 713/158 |

(Continued)

FOREIGN PATENT DOCUMENTS

| JP | 2014013960 A | 1/2014 |
| JP | 2014174560 A | 9/2014 |

OTHER PUBLICATIONS

Rekhter, "Address Allocation for Private Internets", RFC 1918, 1996, pp. 1-9. (Year: 1996).*

*Primary Examiner* — Benjamin E Lanier
(74) *Attorney, Agent, or Firm* — Rossi, Kimms & McDowell LLP

(57) ABSTRACT

A communication device capable of performing encrypted communication with other communication device with use of a common key, obtains, from the other communication device, a certificate including a public key and identification information on the other communication device, verifies validity of the certificate on a basis of the identification information on the other communication device included in the certificate, and transmits the common key encrypted by the public key to the other communication device to perform the encrypted communication in a case where the certificate is valid as a result of the verification.

11 Claims, 7 Drawing Sheets

(56) References Cited

U.S. PATENT DOCUMENTS

| | | | | |
|---|---|---|---|---|
| 2013/0036303 A1* | 2/2013 | Himawan | ............ | H04L 9/3268 |
| | | | | 713/158 |
| 2016/0364723 A1* | 12/2016 | Reese | ................ | G06Q 20/4012 |
| 2017/0221055 A1* | 8/2017 | Carlsson | ............ | G06Q 20/3227 |
| 2018/0248834 A1* | 8/2018 | Pan | ......................... | H04L 67/20 |

* cited by examiner

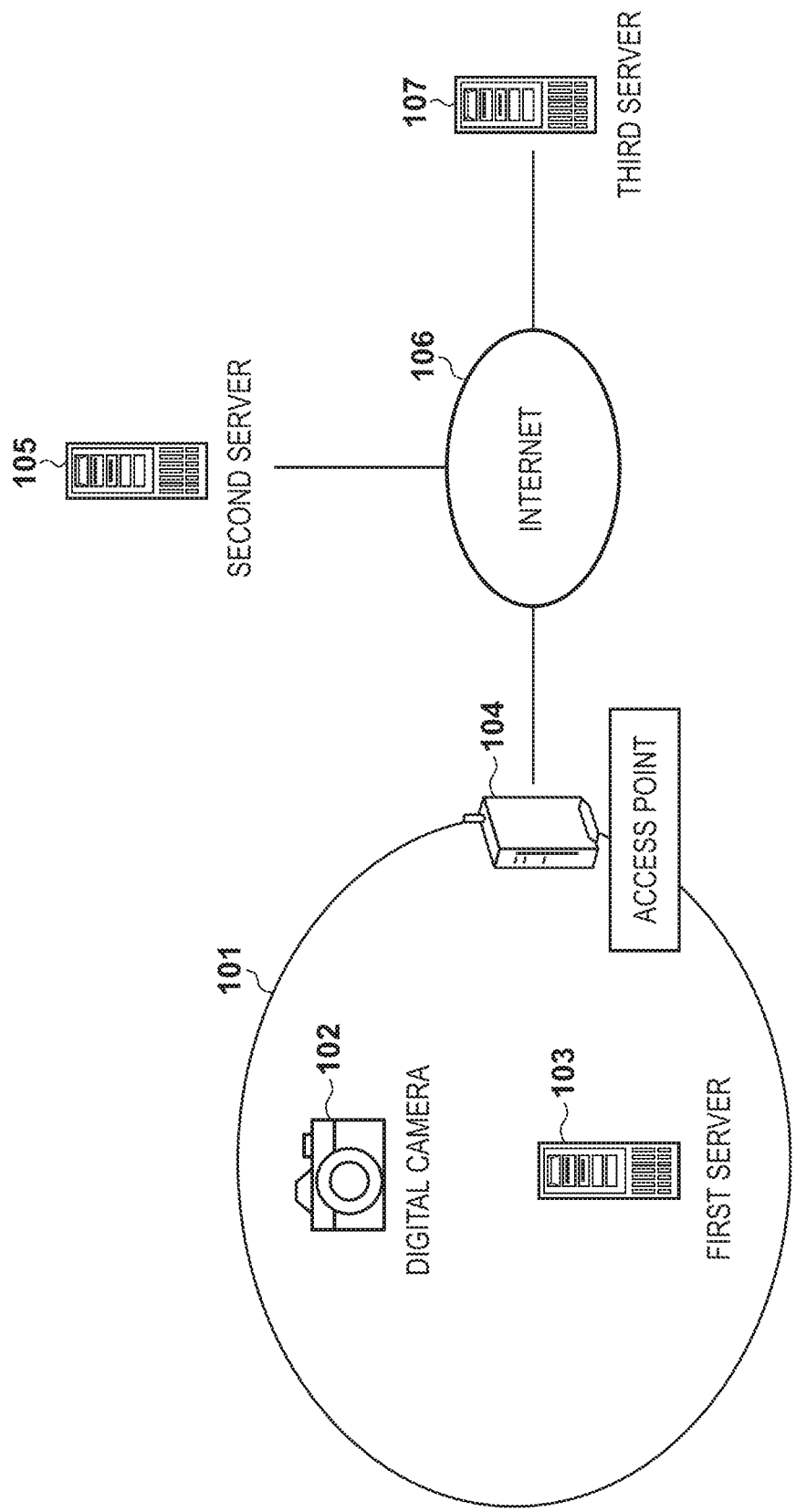

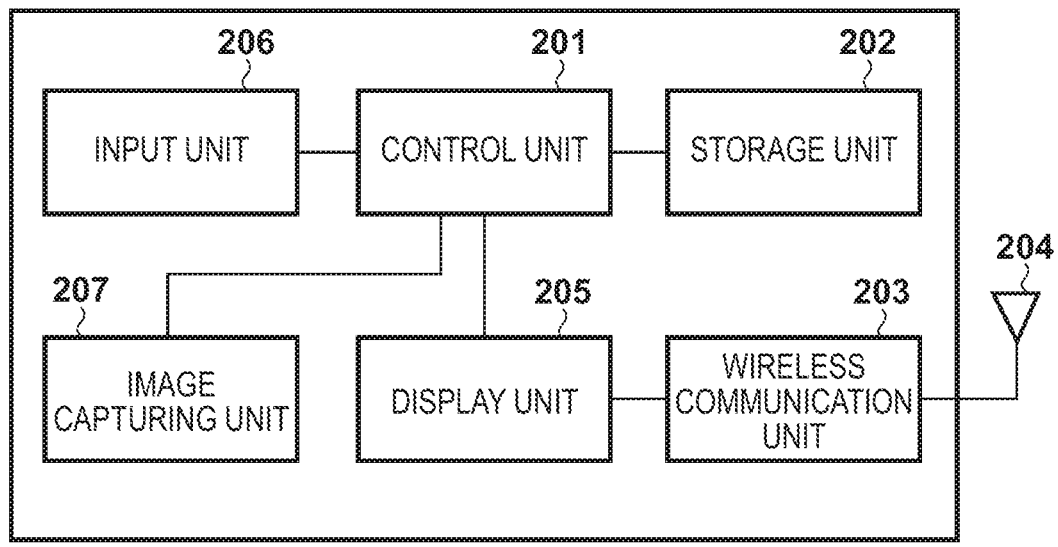
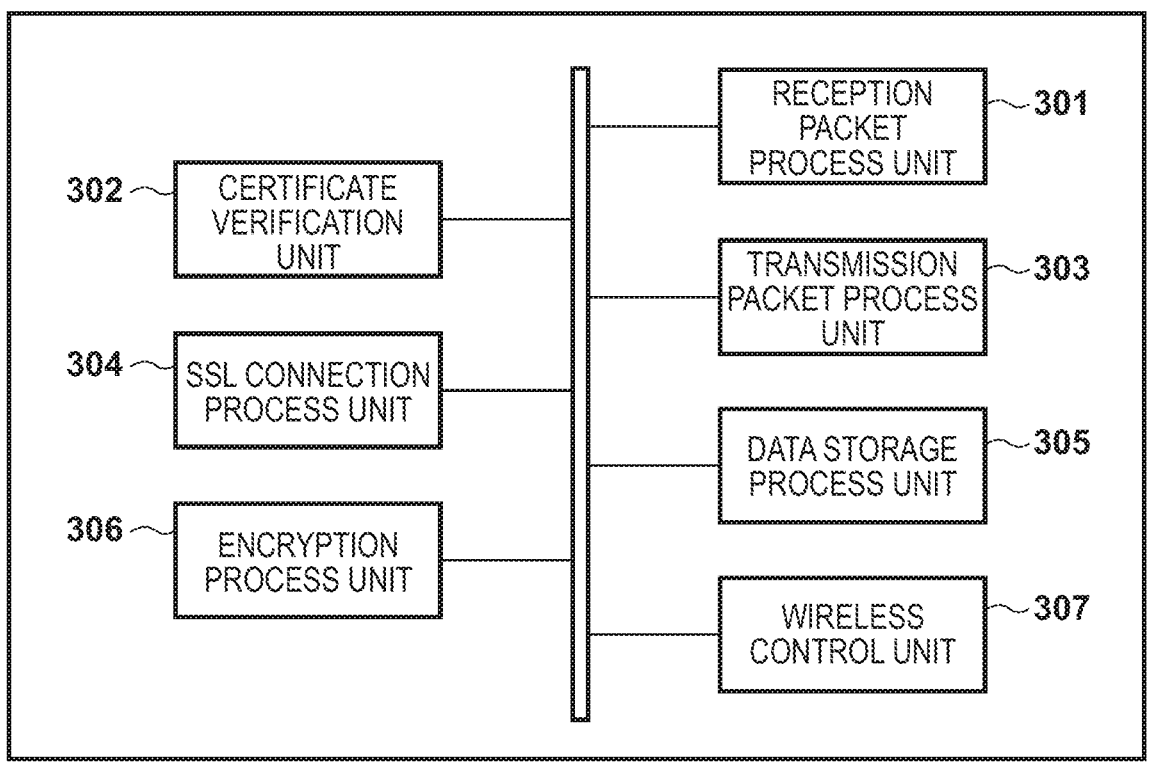

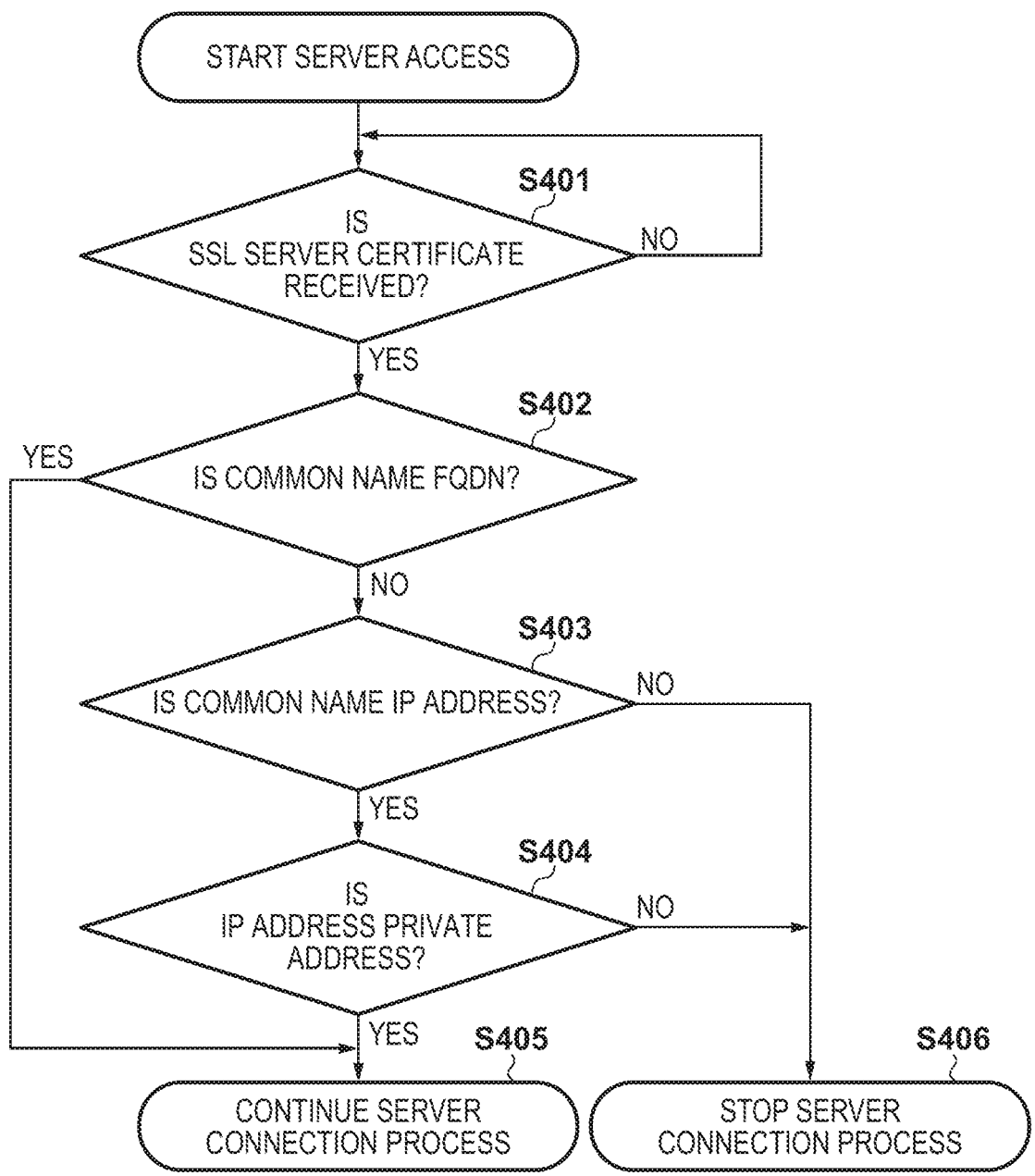

FIG. 9

| SSL SERVER CERTIFICATE | |
|---|---|
| 901 ~ START OF EFFECTIVE PERIOD | NOVEMBER 22, 2017 |
| 902 ~ END OF EFFECTIVE PERIOD | NOVEMBER 22, 2020 |
| 903 ~ COMMON NAME | www.xxx.co.jp |
| 904 ~ PUBLIC KEY | ********************* |
| ... | |

FIG. 10

| DESCRIPTION TYPES OF COMMON NAMES IN SSL SERVER CERTIFICATE | |
|---|---|
| FIRST SERVER 103 | 192.168.1.10     (PRIVATE IP ADDRESS) |
| SECOND SERVER 105 | https://www.xxx.co.jp/     (FQDN) |
| THIRD SERVER 107 | 100.x.x.x     (GLOBAL IP ADDRESS) |

FIG. 11

| PRIVATE ADDRESS AREA OF IP ADDRESS |
|---|
| 10.0.0.0~10.255.255.255 |
| 172.16.0.0~172.31.255.255 |
| 192.168.0.0~192.168.255.255 |

COMMUNICATION DEVICE, METHOD OF CONTROLLING COMMUNICATION DEVICE, AND NON-TRANSITORY COMPUTER-READABLE STORAGE MEDIUM

BACKGROUND OF THE INVENTION

Field of the Invention

The present invention relates to a communication device, a method of controlling communication device, and a non-transitory computer-readable storage medium.

Description of the Related Art

In recent years, cases of using electronic devices such as digital cameras, printers, mobile phone and smart phones connected to a wireless LAN have increased. In addition, techniques in which such electronic devices using HTTP (Hypertext Transfer Protocol) protocols operate as clients and access servers are known. For example, an electronic device that operates as a client can upload or download desired data to/from a server.

Encrypted communications adopting authentication techniques that use a server certificate to increase the security of access to a server from clients are known. For example, in an SSL (Secure Sockets Layer) encrypted communication, when a client first starts a process of accessing a server, the client obtains an SSL server certificate from the server. The SSL server certificate includes the expiration date of the certificate, a common name of the server, a public key, and the like. Here, the common name is information (identification information for identifying the server) for accessing the server, and is described in a FQDN (Fully Qualified Domain Name), which is the URL of the server, an IP address, and the like, for example. The client that has obtained the SSL server certificate verifies the validity of the certificate with use of a CA (Certification Authority) certificate and the like of itself for the SSL server certificate. When the validity is confirmed, the client encrypts the common key with use of the public key included in the SSL server certificate and sends the encrypted common key to the server. The server decrypts the received common key with the private key and obtains the common key of the client. Thereafter, the client and the server can encrypt the communication data with the shared common key.

In addition to the above-mentioned techniques, there is a technique for increasing the security of access to a server from a client. Japanese Patent Laid-Open No. 2014-174560 discloses a technique in which a relay machine provided between a client and a server allows a server connection of the client upon confirming the integrity of the client and the client certificate. Japanese Patent Laid-Open No. 2014-013960 discloses a technique in which subnet addresses of IP addresses of a client and a server are compared, and a transfer process is performed with encryption in accordance with the result of the comparison.

As described above, an SSL server certificate includes a common name, and the common name is described in, for example, an FQDN and an IP address. Description using an FQDN requires a DNS (Domain Name System) server that performs an operation of obtaining the IP address from the FQDN. On the other hand, the DNS server is not required when the IP address is indicated. As such, a DNS server is required when the common name of the SSL server certificate is described in an FQDN, but installation of a server in a network aimed at spoofing by a malicious third party can be reduced. On the other hand, the DNS server is not required when the common name is described in an IP address, and consequently a malicious person may easily install a server aimed for spoofing.

SUMMARY OF THE INVENTION

In view of the above problems, the present disclosure provides techniques for further increasing the security of encrypted communication.

According to one aspect of the present invention, there is provided a communication device capable of performing encrypted communication with other communication device with use of a common key, the communication device comprises: an obtaining unit configured to obtain, from the other communication device, a certificate including a public key and identification information on the other communication device; a verification unit configured to verify validity of the certificate on a basis of the identification information on the other communication device included in the certificate; and a transmitting unit configured to transmit the common key encrypted by the public key to the other communication device to perform the encrypted communication in a case where the certificate is valid as a result of verification performed by the verification unit.

Further features of the present invention will become apparent from the following description of exemplary embodiments (with reference to the attached drawings).

BRIEF DESCRIPTION OF THE DRAWINGS

FIG. 1 illustrates a schematic system configuration.

FIG. 2 is a block diagram illustrating an example of a hardware configuration of a digital camera 102.

FIG. 3 is a block diagram illustrating an example of a functional configuration of the digital camera 102 according to First Embodiment.

FIG. 4 is a flowchart of a server connection process performed by the digital camera 102 according to First Embodiment.

FIG. 9 is a diagram illustrating an example of an SSL server certificate.

FIG. 10 illustrates description types of common names included in the SSL server certificate.

FIG. 11 is a diagram illustrating a private address of an IP address.

DESCRIPTION OF THE EMBODIMENTS

First Embodiment

Figure 5:
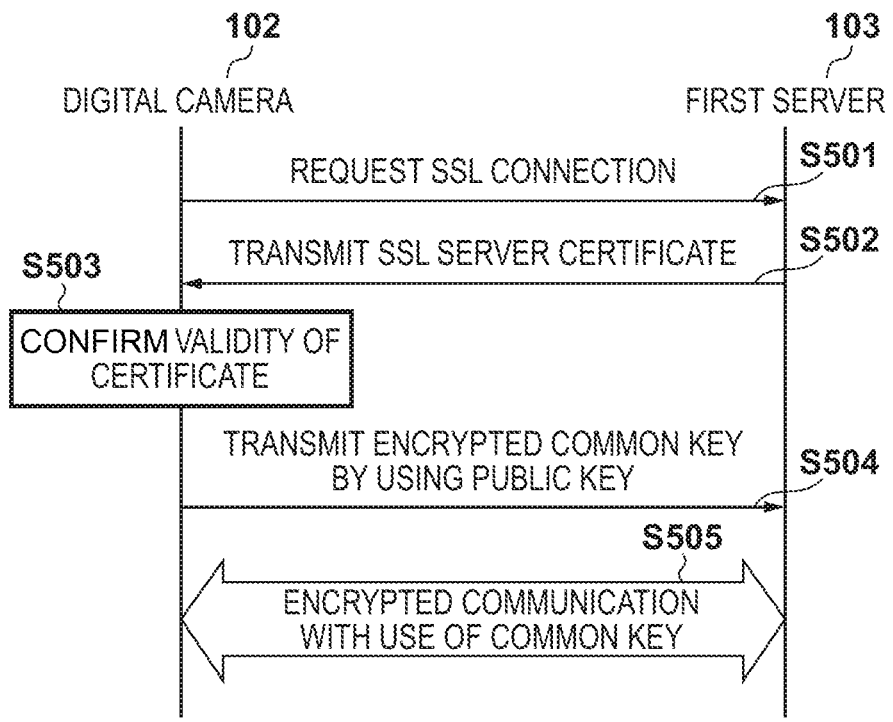
FIG. 5 is a process sequence diagram of the digital camera 102 and a first server 103 according to First Embodiment.

A communication device according to the present embodiment is described in detail below with reference to the drawings. An example using a wireless LAN (Local Area Network) system typified by IEEE802.11 standard is described below, but the communication form is not limited to a wireless LAN. For example, communication using an IP network such as a wired LAN, a 6LowPan, and an IPoverUSB, or a wired-wireless composite network system may be utilized. Also, the scope of the present invention is defined by the claims and is not limited by the following individual embodiments.

System Configuration

FIG. 1 illustrates a schematic system configuration according to the present embodiment. A first server 103, a second server 105, and a third server 107 are server devices. A digital camera 102 and the first server 103 have participated in a wireless network 101 configured by an access point 104. The second server 105 and the third server 107 can connect with the access points 104 via an Internet 106. In the present embodiment, the first server 103 and the second server 105 can provide services for implementing a data upload process.

The digital camera 102 is in a state capable of wirelessly communicating with a device connected with the wireless network 101. The first server 103 is also wirelessly connected with the wireless network 101 and is in a state capable of wirelessly communicating with a device connected with the wireless network 101 as with the digital camera 102. For example, the digital camera 102 can upload image data obtained by capturing an image to the first server 103. The second server 105 and the third server 107 have not participated in the wireless network 101. Accordingly, to access the second server 105 and the third server 107, a device in the wireless network 101 requires a connection process via the Internet 106. While FIG. 1 illustrates a system configuration using a wireless LAN, a system configured with a wired LAN or a combination of a wired LAN and a wireless LAN may also be adopted as described above.

Configuration of Digital Camera 102

FIG. 2 is a block diagram illustrating an example of a hardware configuration of the digital camera 102 according to the present embodiment. A control unit 201 controls the entire digital camera 102 by executing a control program stored in a storage unit 202. The control unit 201 is composed of one or a plurality of CPU (Central Process Unit). The storage unit 202 stores a control program to be executed by the control unit 201, and various information such as a communication parameter, a private key, and the like. The various operations described later can be performed when the control unit 201 executes a control program stored in the storage unit 202. A wireless communication unit 203 has a function of controlling a wireless LAN antenna 204, and controls transmission and/or reception of packets, generation and connection of wireless networks, and the like. A display unit 205 has a function of outputting visual information. For example, the display unit 205 has a function capable of outputting visually perceptible information such as an LCD (Liquid Crystal Display) and an LED (Light-Emitting Diode). An input unit 206 accepts various inputs and the like for a user to operate the digital camera 102. An image capturing unit 207 performs an image capturing process and generates image data. Although not illustrated, the digital camera 102 may include an output unit (such as a speaker) that outputs sound information.

FIG. 3 is a block diagram illustrating an example of a functional configuration of the digital camera 102 according to the present embodiment. A reception packet process unit 301 performs a reception process on a packet received from an opposing device via the wireless communication unit 203. A transmission packet process unit 303 performs a transmission process on data to be transmitted, and passes the processed packet to the wireless communication unit 203 to transmit it to the opposing device. The reception process performed by the reception packet process unit 301 and the transmission process performed by the transmission packet process unit 303 may be based on protocols such as wireless LAN standards, TCP/IP, HTTP. The data storage process unit 305 stores, in the storage unit 202, the software itself, and information such as encryption keys necessary for encryption of communication data and IP addresses. A certificate verification unit 302 verifies the validity of the SSL (Secure Sockets Layer) server certificate obtained via the reception packet process unit 301 by the opposing device. An SSL connection process unit 304 transmits a request for the SSL server certificate to the opposing device via the transmission packet process unit 303. The SSL connection process unit 304 controls a connection (SSL connection) for SSL encrypted communication in accordance with the result of the verification performed by the certificate verification unit 302 to establish SSL encrypted communication. An encryption process unit 306 encrypts and decrypts communication data with the opposing device in the SSL encrypted communication established by the SSL connection process unit 304. A wireless control unit 307 controls the wireless communication unit 203 to control connection and disconnection to/from a desired wireless network.

Note that all of the functional blocks illustrated in FIG. 3 have a software or hardware correlation. In addition, the functional block described above is an example, and a plurality of functional blocks may configure one functional block, or any of the functional blocks may be further divided into blocks that perform a plurality of functions.

Flow of Processes

Next, the connection process from the digital camera 102 to the server device according to the present embodiment is described. FIG. 4 is a flowchart of a connection process with a server device by the digital camera 102 according to the present embodiment. The flowchart illustrated in FIG. 4 can be implemented when the control unit 201 of the digital camera 102 executes a control program stored in the storage unit 202 so as to execute calculation and manipulation of information, and control of each hardware.

It is assumed that, prior to the processes of this flowchart, the following processes are performed. First, the digital camera 102 selects image data to be uploaded. Here, the image data to be uploaded may be selected by operation via the input unit 206 by the user, or may be autonomously selected by the digital camera 102 in accordance with a predetermined condition. Next, the digital camera 102 selects the upload destination server device. Note that the process order of the selection of the image data to be uploaded and the selection of the upload destination server device may be reversed. The upload destination server device may be autonomously selected by the digital camera 102 using information stored in advance by the data storage process unit 305 in the storage unit 202, or may be selected by operation via the input unit 206 by the user. In the selection by the user, the user may, for example, select (identify) one or more servers via the input unit 206 from information displayed on the display unit 205 for identifying the server. Examples of such information may include URL of a server and the like. After selection of the image data to be uploaded and the upload destination server device, the digital camera 102 starts a connection process to the selected server device in response to an operation performed by the user via the input unit 206 as necessary. Specifically, the SSL connection process unit 304 of the digital camera 102 transmits, via the transmission packet process unit 303, a request for an SSL server certificate to the selected server device to start the SSL connection process.

After such a process, as a response to the request for the SSL server certificate, the reception packet process unit 301 determines whether the SSL server certificate has been received (S401). When the SSL server certificate has been received (Yes at S401), the certificate verification unit 302 verifies the validity of the SSL server certificate. FIG. 9 illustrates an example of the SSL server certificate. As illustrated in FIG. 9, the SSL server certificate includes a start 901 of an effective period, an end 902 of the effective period, a common name 903, and a public key 904. In the SSL server certificate illustrated in FIG. 9, the start 901 of the effective period is "Nov. 22, 2017", the end 902 of the effective period is "Nov. 22, 2020", the common name 903 is "www.xxx.co.jp", and the public key 904 includes predetermined encryption information. The common name 903 in FIG. 9 is described in an FQDN (Fully Qualified Domain Name) but may also be described by other techniques.

FIG. 10 illustrates description types of common names included in SSL server certificates from the first server 103, the second server 105, and the third server 107 according to the present embodiment. As illustrated in FIG. 10, the common names included in SSL server certificates from the first server 103, the second server 105, and the third server 107 are described in a private IP address, an FQDN, and a global IP address, respectively. In this embodiment, the certificate verification unit 302 uses at least a common name in the SSL server certificate to verify the validity of the SSL server certificate. Note that, the certificate verification unit 302 may verify the validity of the SSL server certificate on the basis of other information (e.g., information of the end 902 of the effective period in FIG. 9) in addition to the common name.

When the common name is described in an FQDN (Yes at S402), the certificate verification unit 302 determines that the received SSL server certificate is valid and the SSL connection process unit 304 continues the connection process to the server device (S405). As illustrated in FIG. 10, since the common name included in the SSL server certificate from the second server 105 is described in an FQDN, the SSL connection process unit 304 can continue the connection process for the second server 105.

When the common name is described in an IP address (Yes at S403), the certificate verification unit 302 further verifies the attribution of the IP address to determine whether the IP address is a private IP address (S404). Specifically, the certificate verification unit 302 determines whether the IP address is present in a private address area. FIG. 11 illustrates a private address area of an IP address. This private address area is defined by RFC (Request For Comment) 1918. When the IP address is present in the private address area illustrated in FIG. 11, the IP address is determined to be a private IP address. Note that, in the process of S404, the certificate verification unit 302 may determine whether the address is an address in a particular domain (e.g., an in-house domain, etc.) instead of determining whether the IP address is a private address. In this case, when the IP address is an address in a particular domain, the connection process to the server device may be continued.

When the common name is described in an IP address and this IP address is a private address (Yes at S404), the server device can be identified as a server device in the local network, i.e., the wireless network 101. Accordingly, the certificate verification unit 302 determines that the server device is a server device access to which is managed in the local network, and the SSL connection process unit 304 continues the connection process to the server (S405). As illustrated in FIG. 10, the common name included in the SSL server certificate from the first server 103 is described in the IP address in the private address area illustrated in FIG. 11. Accordingly, the SSL connection process unit 304 can continue the SSL connection process for the first server 103.

In contrast, the common name included in the SSL server certificate from the third server 107 is described in an IP address outside the private address area illustrated in FIG. 11, i.e., an IP address in the global address area. Accordingly, since the method of managing access to the server is unclear, the SSL connection process unit 304 stops the SSL connection process to the third server 107 (S406). Note that also when the description of the common name is not an FQDN or an IP address (No at S403), the server connection process is stopped (S406).

Through the above-mentioned processes, the digital camera 102 can securely upload the image data to be uploaded to the first server 103 and/or the second server 105, which are servers capable of making an SSL connection and providing services for uploading.

Next, a process flow of the digital camera 102 and the first server 103 is described. FIG. 5 is a process sequence diagram of the digital camera 102 and the first server 103 according to the present embodiment. When the digital camera 102 is operated to select the first server 103 as the upload destination server device, the SSL connection process unit 304 of the digital camera 102 starts an SSL connection request to the first server 103 (S501). The first server 103 having received the request transmits the SSL server certificate that certifies its validity to the digital camera 102 (S502). The certificate verification unit 302 of the digital camera 102 confirms the validity of the received SSL server certificate in accordance with the process illustrated in FIG. 4 (S503). As illustrated in FIG. 10, since the common name included in the SSL server certificate from the first server 103 is described in an IP address in the private address area, the SSL connection process unit 304 of the digital camera 102 determines to continue the SSL connection process for the first server 103. Subsequently, the SSL connection process unit 304 of the digital camera 102 encrypts a common key for achieving encrypted communication with the first server 103 with use of the public key described in the SSL server certificate (encryption using the public key), and transmits the encrypted common key to the first server 103 (S504). Thereafter, the digital camera 102 can perform encrypted communication with the first server 103 with use of the common key shared in the above-mentioned manner (S505).

In the above description, the certificate verification unit 302 determines whether the SSL connection process to the server device can be performed on the basis of whether the IP address is a private IP address in the case where the common name of the SSL server certificate is described in an IP address. As modifications, the following methods are possible. For example, there is a method of registering an IP address of the first server 103 in the digital camera 102 in advance. The user of the digital camera 102 obtains the IP address information of the first server 103 from a network administrator or the like of the wireless network 101 by input via the input unit 206, for example. Next, the digital camera 102 registers (sets) the obtained IP address information in the host device, and further stores the obtained IP address information in the storage unit 202. Thereafter, the certificate verification unit 302 of the digital camera 102 compares the registered IP address information with IP address information described in the common name included in the server SSL certificate received from the first server 103. Whether the SSL connection process can be performed on the server device can be determined based on a result of the above-mentioned comparison of the address. That is, when they are consistent, the certificate verification unit 302 determines that the server SSL certificate is valid, and the SSL connection process unit 304 can continue the SSL connection process.

In addition, there is another method that uses the IP address assigned to the digital camera 102 and a subnet mask (a numerical value capable of identifying a network address) registered in advance. The certificate verification unit 302 of the digital camera 102 calculates, from the IP address and the subnet mask of the digital camera 102, the IP address area of the server device where the SSL connection process can be performed. For example, it is assumed that "/24 (255.255.255.0)" is registered in advance as a subnet mask in the storage unit 202 of the digital camera 102. In addition, it is assumed that the digital camera 102 is assigned with "192.168.1.100" as the IP address. In this case, the certificate verification unit 302 can derive a valid range from "192.168.1.1" to "192.168.1.255" with the use of the assigned IP address and the data of the registered subnet mask. The certificate verification unit 302 confirms whether there is an IP address described in a common name in the SSL server certificate received from the server device in the derived valid range of the IP address. Whether the SSL connection process can be performed on the server device can be determined based on a result of the above-mentioned confirmation of the address. Specifically, when an IP address described in a common name is present in the valid range, the certificate verification unit 302 determines that the server SSL certificate is valid, and the SSL connection process unit 304 can continue the SSL connection process.

In addition, the IPv4 address and HTTP are used in the present embodiment, but the present invention is not limited thereto, and the present invention may be applied to other protocols such as using an IPv6 address and/or SSL/TLS.

As described above, according to the present embodiment, the digital camera 102 can determine whether the server device is to be SSL-connected, in accordance with the description of the common name of the SSL server certificate issued by the server device. Thus, a connection operation to a server device whose operating entity is unclear can be prevented, and the user of a digital camera can reliably upload image data obtained by capturing an image to a server device.

Second Embodiment

According to First Embodiment, the certificate verification unit 302 of the digital camera 102 determines whether SSL connection with the server device can be performed on the basis of the type of the common name included in the SSL server certificate. The present embodiment describes an example applying a protocol of detecting the service provided by a server device, such as SSDP (Simple Service Discovery Protocol), and mDNS (Multicast DNS). Points different from First Embodiment are described below.

System Configuration and Configuration of Digital Camera 102

A system configuration of the present embodiment is the same as that of FIG. 1 described in First Embodiment, and therefore descriptions thereof will be omitted. The hardware configuration of the digital camera 102 of the present embodiment is the same as that of FIG. 2 described in First Embodiment, and therefore descriptions thereof will be omitted.

Figure 6:
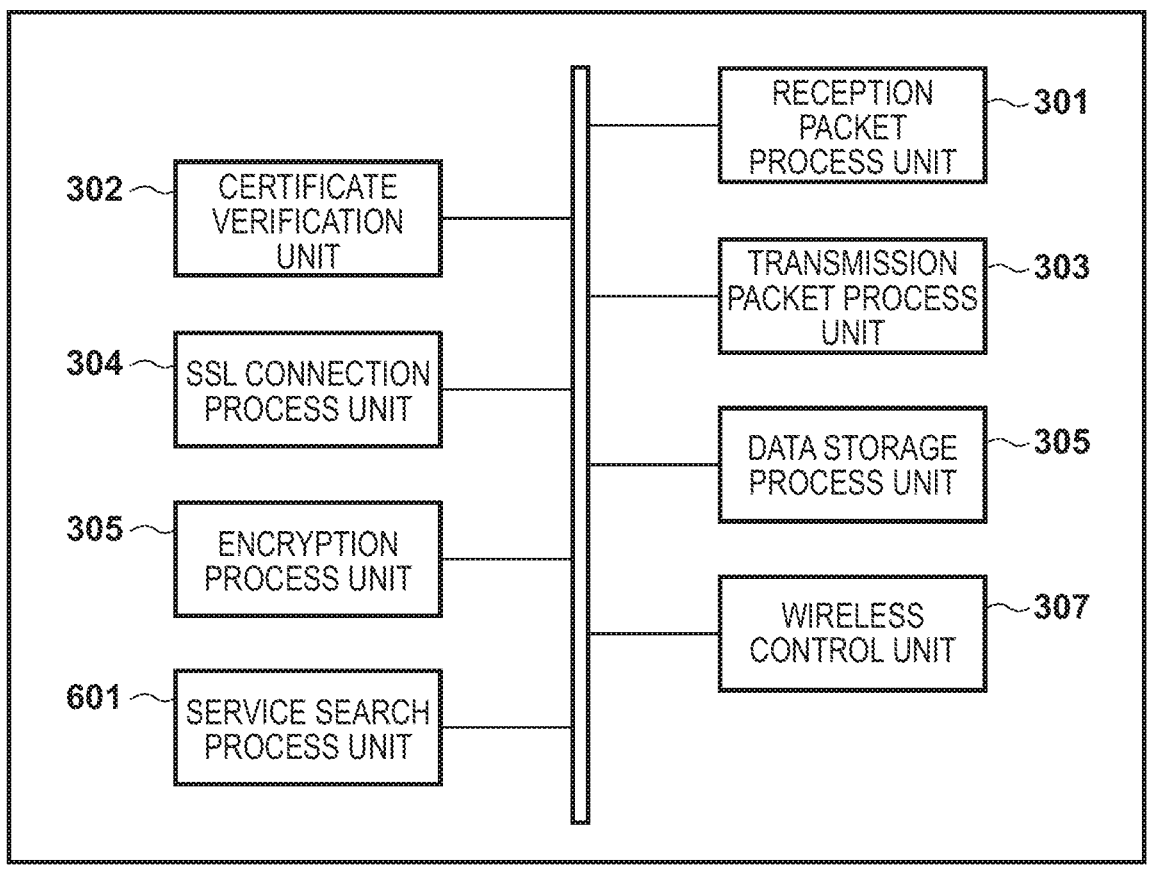
FIG. 6 is a block diagram illustrating an example of a functional configuration of the digital camera 102 according to Second Embodiment.

FIG. 6 is a block diagram illustrating an example of a functional configuration of the digital camera 102 according to the present embodiment. It is different from FIG. 3 described in First Embodiment in a service search process unit 601. Other configurations are the same as those of FIG. 3, and therefore descriptions thereof will be omitted. The service search process unit 601 controls a protocol of detecting services provided in the network with use of the above-mentioned SSDP, mDNS, and the like. Specifically, with the use of a protocol such as SSDP and mDNS, the service search process unit 601 can transmit a service detection request for detecting a device that provides a desired service, and can perform control of receiving a service detection response as a response to the request.

Flow of Processes

Figure 7:
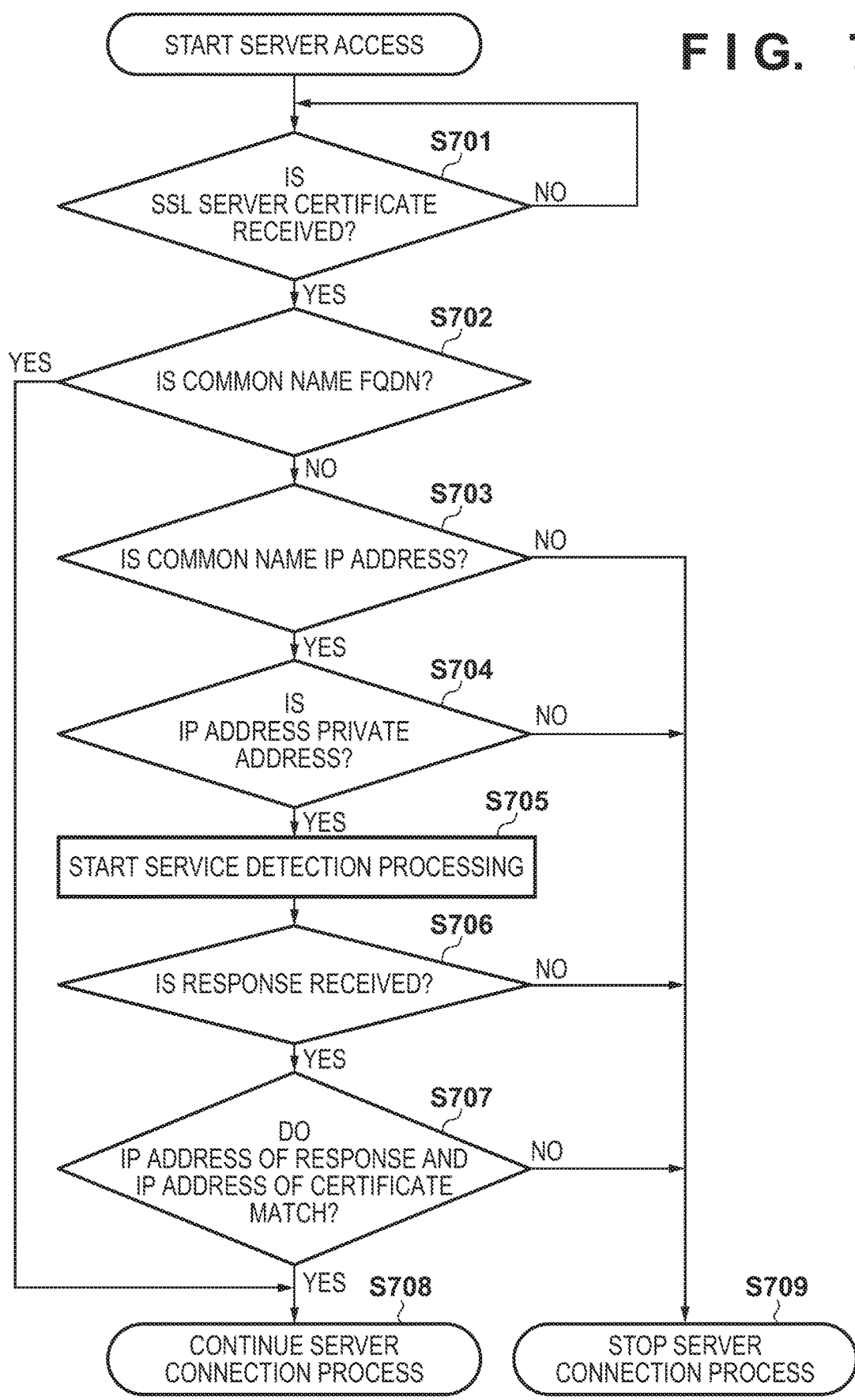
FIG. 7 is a flowchart of a server connection process performed by the digital camera 102 according to Second Embodiment.

Next, a process of accessing the server device from the digital camera 102 according to the present embodiment is described. FIG. 7 is a flowchart of a connection process with the server device by the digital camera 102 according to the present embodiment. The flowchart illustrated in FIG. 7 may be implemented when the control unit 201 of the digital camera 102 executes a control program stored in the storage unit 202 to execute calculation and manipulation of information, and control of each hardware. The processes from S701 to S704 in FIG. 7 are the same as the processes from S401 to S404 in FIG. 4 described in First Embodiment, and therefore descriptions thereof will be omitted.

In FIG. 7, when the common name included in the received SSL server certificate is a private IP address (Yes at S704), the server device can be identified as a server device in the local network, i.e., the wireless network 101. Here, in addition, the service search process unit 601 transmits a service detection request via the transmission packet process unit 303 to detect a device which provides services that the digital camera 102 desires to utilize in the network (S705). In this present embodiment, the service utilized by the digital camera 102 is an image data uploading service. When the service search process unit 601 has failed to receive the service detection response to the transmitted service detection request via the reception packet process unit 301 during a certain period (No at S706), the process proceeds to S709. That is, since the digital camera 102 cannot be provided with the desired service, the server connection process stops (S709).

On the other hand, when the service search process unit 601 has successfully received the service detection response to the transmitted service detection request via the reception packet process unit 301 (Yes at S706), the process proceeds to S707. At S707, the certificate verification unit 302 detects the IP address of the first server 103 from the source address information of the received service detection response. Subsequently, the certificate verification unit 302 compares the detected IP address with the IP address described in the common name of the SSL server certificate previously received. When it is confirmed that they are the same IP address (Yes at S707) as a result of the comparison, the SSL connection process unit 304 identifies that the server is a server device that provides the desired service and continues the server connection process (S708). Specifically, the digital camera 102 determines that the first server 103 is a server device that provides an upload service for the image data and the access thereof is managed in the local network, and the digital camera 102 continues the connection process to the server device. On the other hand, when it is confirmed that the two IP addresses are different (No at S707), the SSL connection process unit 304 stops the server connection process (S709).

Through the above-mentioned processes, the digital camera 102 can upload the image data to be uploaded to the first server 103 and/or the second server 105, which are server devices capable of making an SSL connection, confirmed to provide services for uploading.

Figure 8:
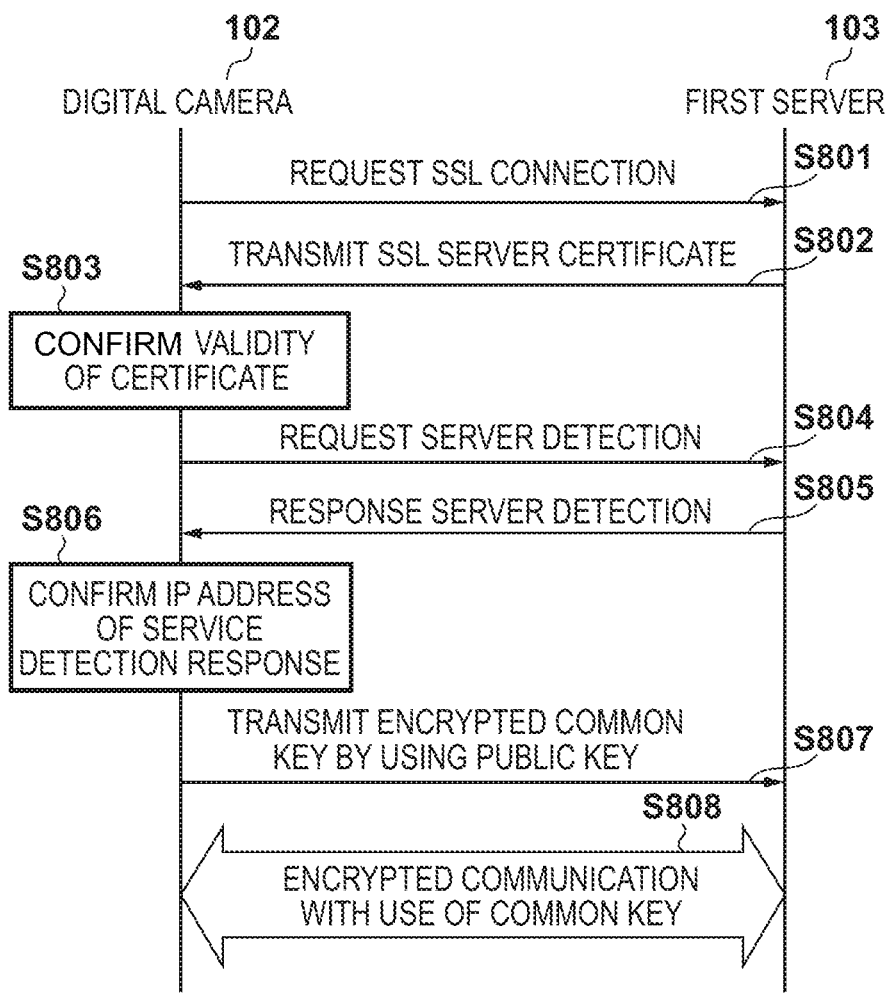
FIG. 8 is a process sequence diagram of the digital camera 102 and the first server 103 according to Second Embodiment.

Next, a process flow of the digital camera 102 and the first server 103 is described. FIG. 8 is a process sequence diagram of the digital camera 102 and the first server 103 according to the present embodiment. When the digital camera 102 is operated to select the first server 103 as the upload destination server, the SSL connection process unit 304 of the digital camera 102 starts an SSL connection request to the first server 103 (S801). The first server 103 having received the request transmits an SSL server certificate that certifies its validity to the digital camera 102 (S802). The certificate verification unit 302 of the digital camera 102 confirms the validity of the received SSL server certificate in accordance with the process illustrated in FIG. 4 (S803). As illustrated in FIG. 10, the common name included in the SSL server certificate from the first server 103 is described in an IP address in the private address area. Accordingly, the service search process unit 601 of the digital camera 102 transmits a service detection request to the first server 103 (S804).

The first server 103 having received the service detection request can provide an upload service as described above, and therefore transmits a service detection response to the digital camera 102 to indicate that it is in a service-offering state (S805). The service search process unit 601 of the digital camera 102 having received the service detection response detects the IP address of the first server 103 from the source address information of the response (S806). Further, the service search process unit 601 notifies the certificate verification unit 302 of the detected IP address. The certificate verification unit 302 confirms the detected IP address (S806). Specifically, the certificate verification unit 302 compares the detected IP address with the IP address described in the common name of the SSL server certificate received at S802. When it is confirmed that they are the same IP address as a result of the comparison, the SSL connection process unit 304 determines that the SSL connection process continues for the first server 103. Subsequently, the SSL connection process unit 304 of the digital camera 102 encrypts a common key for achieving encrypted communication with the first server 103 with use of the public key described in the SSL server certificate, and transmits the encrypted common key to the first server 103 (S807). Thereafter, the digital camera 102 can perform encrypted communication with the first server 103 with use of the common key shared in the above-mentioned manner (S808).

As described above, according to the present embodiment, the digital camera 102 can determine whether the server device is to be SSL-connected, in accordance with the description of the common name of the SSL server certificate issued by the server device. Further, the digital camera 102 can identify a server that provides the desired service and the validity of the SSL server certificate by applying a protocol of detecting the service. Thus, a connection operation to a server device whose operating entity is unclear can be prevented, and the user of a digital camera can reliably upload image data obtained by capturing of an image to a server device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-151965, filed Aug. 10, 2018, which is hereby incorporated by reference herein in its entirety.

What is claimed is:

1. A communication device capable of performing encrypted communication with an other communication device with use of a common key, the communication device comprising:
    one or more processors; and
    at least one memory coupled to the one or more processors and having stored thereon instructions, which when executed by the one or more processors, cause the communication device to:
    obtain, from the other communication device, a certificate including a public key and identification information on the other communication device;
    verify validity of the certificate solely on a basis of the identification information on the other communication device included in the certificate; and
    transmit the common key encrypted by the public key to the other communication device to perform the encrypted communication in a case where the certificate is verified as valid,
    wherein when the communication device obtains information of an IP address as the identification information on the other communication device included in the certificate, the communication device continues a connection process to the other communication device in a case where the IP address of the obtained information is a private address and stops the connection process to the other communication device in a case where the IP address of the obtained information is not a private address.

2. The communication device according to claim 1, wherein the communication device verifies that the certificate is valid in a case where the identification information on the other communication device included in the certificate is an IP address included in a predetermined address area.

3. The communication device according to claim 2, wherein the predetermined address area is an area defined by Request For Comment (RFC) 1918.

4. The communication device according to claim 1, wherein the communication device verifies that the certificate is valid in a case where the identification information on the other communication device included in the certificate is an IP address of the other communication device registered in advance in the communication device.

5. The communication device according to claim 1, wherein the communication device verifies that the certificate is valid in a case where the identification information on the other communication device included in the certificate is an IP address included in a range that is calculated using an IP address and data of a subnet mask assigned to the communication device.

6. The communication device according to claim 1, wherein the communication device verifies that the certificate is valid in a case where the identification information on the other communication device included in the certificate is a fully qualified domain name (FQDN).

7. The communication device according to claim 1, wherein the instructions further cause the communication device to detect a device that provides a predetermined service, and
wherein the communication device transmits the common key encrypted by the public key to the other communication device to perform the encrypted communication in a case where the certificate is verified as valid and the detected device is the other communication device.

8. The communication device according to claim 7, wherein the communication device detects the device that provides the predetermined service with use of a simple service discovery protocol (SSDP) or a multicast DNS (mDNS) protocol.

9. The communication device according to claim 1, wherein the instructions further cause the communication device to make a connection request to the other communication device, and
wherein the communication device obtains the certificate from the other communication device as a response to the connection request.

10. A method of controlling a communication device capable of performing encrypted communication with an other communication device with use of a common key, the method comprising:
obtaining, from the other communication device, a certificate including a public key and identification information on the other communication device;
verifying validity of the certificate solely on a basis of the identification information on the other communication device included in the certificate; and
transmitting the common key encrypted by the public key to the other communication device to perform the encrypted communication in a case where the certificate is verified as valid,
wherein when the communication device obtains information of an IP address as the identification information on the other communication device included in the certificate, the communication device continues a connection process to the other communication device in a case where the IP address of the obtained information is a private address and stops the connection process to the other communication device in a case where the IP address of the obtained information is not a private address.

11. A non-transitory computer-readable storage medium storing a computer program for causing a computer to execute a method of controlling a communication device capable of performing encrypted communication with an other communication device with use of a common key, the method comprising:
obtaining, from the other communication device, a certificate including a public key and identification information on the other communication device;
verifying validity of the certificate solely on a basis of the identification information on the other communication device included in the certificate; and
transmitting the common key encrypted by the public key to the other communication device to perform the encrypted communication in a case where the certificate is verified as valid,
wherein when the communication device obtains information of an IP address as the identification information on the other communication device included in the certificate, the communication device continues a connection process to the other communication device in a case where the IP address of the obtained information is a private address and stops the connection process to the other communication device in a case where the IP address of the obtained information is not a private address.

* * * * *